(12) United States Patent
Kurz et al.

(10) Patent No.: US 10,096,895 B2
(45) Date of Patent: *Oct. 9, 2018

(54) METHOD OF MANUFACTURING AN ANTENNA

(71) Applicant: A.K. Stamping Company, Inc., Moutainside, NJ (US)

(72) Inventors: Arthur Kurz, New Vernon, NJ (US); Mark Andrews, Wharton, NJ (US)

(73) Assignee: A.K. Stamping Company, Inc., Mountainside, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,051

(22) Filed: Feb. 1, 2016

(65) Prior Publication Data

US 2016/0149296 A1    May 26, 2016

Related U.S. Application Data

(62) Division of application No. 13/833,888, filed on Mar. 15, 2013, now Pat. No. 9,252,478.

(51) Int. Cl.
*H01Q 1/38* (2006.01)
*H01P 11/00* (2006.01)
(Continued)

(52) U.S. Cl.
CPC ......... *H01Q 1/38* (2013.01); *G06K 19/07718* (2013.01); *G06K 19/07783* (2013.01);
(Continued)

(58) Field of Classification Search
CPC ..... H02K 15/0075; H02K 15/09; H01R 39/32
See application file for complete search history.

(56) References Cited

U.S. PATENT DOCUMENTS 5,199,157 A    4/1993    Kurz et al.
6,326,920 B1    12/2001    Barnett et al.
(Continued)

FOREIGN PATENT DOCUMENTS

EP    1486996 A1    12/2004
JP    2000072819 A    6/2000
(Continued)

OTHER PUBLICATIONS

Extended European Search Report dated Oct. 18, 2016, issued in connection with European Patent Application No. 14769760.1 (7 pages).
(Continued)

*Primary Examiner* — Minh Trinh
(74) *Attorney, Agent, or Firm* — McCarter & English, LLP

(57) ABSTRACT

A method of manufacturing a stamped antenna includes providing a sheet of metallic material for a first stamping. A first stamping of the sheet of metallic material is performed to form at least one antenna that includes traces, contacts, a carrier connected to the traces, and at least one tie-bar connected between the traces. A pad is provided with at least one pressure sensitive adhesive area that is provided on the pad in substantially the same shape as the traces of the antenna. The pressure sensitive adhesive area is aligned with the traces of the antenna, and then bonded to the traces of the at least one antenna. A second stamping of the at least one antenna and the pressure sensitive adhesive is then performed to remove the at least one carrier and the at least one tie-bar connected to the traces.

10 Claims, 18 Drawing Sheets

(51) Int. Cl.
*H01Q 1/00* (2006.01)
*H01Q 9/00* (2006.01)
*H01Q 1/22* (2006.01)
*G06K 19/077* (2006.01)

(52) U.S. Cl.
CPC ............. *H01P 11/001* (2013.01); *H01Q 1/00* (2013.01); *H01Q 1/2208* (2013.01); *H01Q 9/00* (2013.01); *Y10T 29/49016* (2015.01); *Y10T 428/24612* (2015.01)

(56) References Cited

U.S. PATENT DOCUMENTS

| | | | |
|---|---|---|---|
| 6,691,696 | B2 | 2/2004 | Akram et al. |
| 7,229,018 | B2 | 6/2007 | Kurz |
| 7,237,319 | B2 | 7/2007 | Kasahara et al. |
| 7,250,868 | B2 | 7/2007 | Kurz et al. |
| 7,500,307 | B2 | 3/2009 | Munn |
| 7,637,000 | B2 | 12/2009 | Clark |
| 9,252,478 | B2 | 2/2016 | Kurz et al. |
| 2002/0129488 | A1 | 9/2002 | Lieberman |
| 2005/0198811 | A1 | 9/2005 | Kurz et al. |
| 2007/0144662 | A1 | 6/2007 | Armijo et al. |
| 2008/0309561 | A1 | 12/2008 | Lee et al. |
| 2009/0167610 | A1 | 7/2009 | Chen et al. |
| 2010/0199891 | A1 | 8/2010 | Miller et al. |
| 2010/0318440 | A1 | 12/2010 | Coveley |
| 2011/0209338 | A1 | 9/2011 | Chen et al. |
| 2011/0221385 | A1 | 9/2011 | Partovi et al. |
| 2014/0259638 | A1 | 9/2014 | Kurz et al. |
| 2016/0149295 | A1 | 5/2016 | Kurz et al. |
| 2016/0149296 | A1* | 5/2016 | Kurz ................ H01Q 1/00 29/600 |

FOREIGN PATENT DOCUMENTS

| | | |
|---|---|---|
| JP | 2004342755 A | 12/2004 |
| JP | 2007293398 A | 11/2007 |
| JP | 2008262323 A | 10/2008 |
| WO | 2011155401 A1 | 12/2011 |

OTHER PUBLICATIONS

Office Action, dated Mar. 16, 2015, issued in connection with U.S. Appl. No. 13/833,888.
Notice of Allowance dated Sep. 14, 2015, issued in connection with U.S. Appl. No. 13/833,888.
International Search Report of the International Searching Authority dated Jul. 21, 2014, issued in connection with International Application No. PCT/US14/23861.
Written Opinion of the International Searching Authority dated Jul. 21, 2014, issued in connection with International Application No. PCT/14/23861.
International Preliminary Report on Patentability dated Sep. 24, 2015, issued in connection with International Patent Application No. PCT/US14/23861.
First Office Action dated Feb. 22, 2017, along with its English translation, issued in connection with Chinese Patent Application No. 201480027288.X (18 pages).
Office Action dated Sep. 30, 2017, along with its English translation, issued by the State Intellectual Property Office of China in connection with Chinese Patent Application No. 201480027288.x (7 pages).
Office Action dated Dec. 27, 2017, issued in connection with U.S. Appl. No. 15/012,037 (4 pages).
Office Action dated Mar. 27, 2018, along with its English translation, issued by the Japanese Patent Office in connection with Japanese Patent Application No. 2016-501366 (4 pages).

* cited by examiner

METHOD OF MANUFACTURING AN ANTENNA

RELATED APPLICATIONS

This application is a continuation of, and claims the benefit of priority to, U.S. patent application Ser. No. 13/833,888 filed on Mar. 15, 2013, which has issued as U.S. Pat. No. 9,252,478 on Feb. 2, 2016, the entire disclosure of which is expressly incorporated herein by reference.

BACKGROUND OF THE INVENTION

Field of the Invention

The present invention relates to a stamped antenna and a method of manufacturing a stamped antenna, and more specifically, to a method of manufacturing an antenna that includes a first partial initial stamping of the antenna from a sheet of metal, and a subsequent complete stamping of the antenna.

Related Art

As communication technology continues to advance, the use of antennas is becoming more widespread and possible applications are broadening. Various types of antennas are not only used for large scale communication, but also for small scale communication between devices for identification purposes and even for electronic device charging.

Near field communication (NFC) devices are becoming popular for transferring data between two devices that are in proximity of each other. NFC establishes a radio connection between two devices having a NFC antennas, such as smart phones, as well as NFC tags, which are unpowered devices that contain a NFC chip having a NFC antenna. NFC devices, when in close proximity, can engage in two-way communication with one another. This two-way communication allows the devices to transfer data back and forth. Additionally, a NFC device can engage in one-way communication with a NFC tag, such that the NFC device can obtain data from the tag, but cannot transfer information to the tag. NFC tags can be employed for managing the inventory and sale of a wide variety of goods, as well as identification of data pertaining to goods. Accordingly, NFC tags may be used for retaining data that a user can obtain through engaging the tag with a NFC device.

Similarly, radio frequency identification (RFID) tags are finding increased and widespread use as more systems are developed and placed into service for managing the inventory and sale of a wider variety of goods. These RFID tags are applied to the goods and employ electronic circuitry responsive to radio frequency (RF) signals for providing readily monitored identification data relating to the goods.

NFC devices, NFC tags, and RFID tags all include an antenna connected to other circuit components. Because there is pressure to keep devices small, it follows that it is desirable that the antennas for these devices are compact and thin, resulting in antennas having thin widths, and narrow traces with small spacing between the traces. As technology advances, the desire for even more compact articles carrying NFC and RFID antennas increases.

NFC and RFID antennas typically occupy a substantial portion of the area dimensions of the article employing the antenna, and are often constructed of a relatively thin copper foil for flexibility and for maximum effectiveness. Many antennas are currently manufactured by a process involving photochemical etching. The photochemical etching process can often be expensive compared to other metal working techniques.

Accordingly, what would be desirable, but has not yet been provided, is an improved antenna and method of manufacturing.

SUMMARY OF THE INVENTION

The present invention relates to a stamped antenna and a method of manufacturing. A sheet of metallic material is provided and a first partial stamping is performed on the metallic material. The first partial stamping forms an antenna including traces, contacts, carriers connected to the traces, and tie-bars between the traces. A pressure sensitive adhesive is then bonded to the traces of the antenna. A second complete stamping is then performed on the antenna, including pressure sensitive adhesive, to remove the carriers and tie-bars.

BRIEF DESCRIPTION OF THE DRAWINGS

The foregoing features of the disclosure will be apparent from the following Detailed Description, taken in connection with the accompanying drawings, in which.

DETAILED DESCRIPTION

The present invention relates to a method of manufacturing a stamped antenna.

Figure 1:
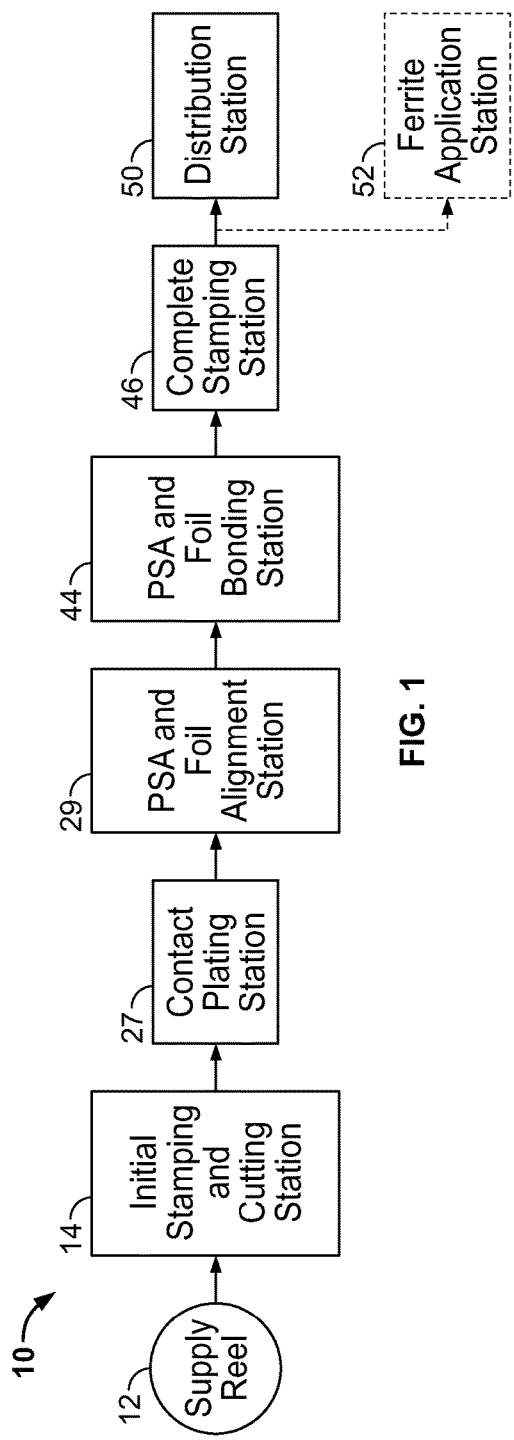
FIG. 1 is a diagrammatic illustration of a sequential manufacturing line for manufacturing an antenna.
Figure 2A:
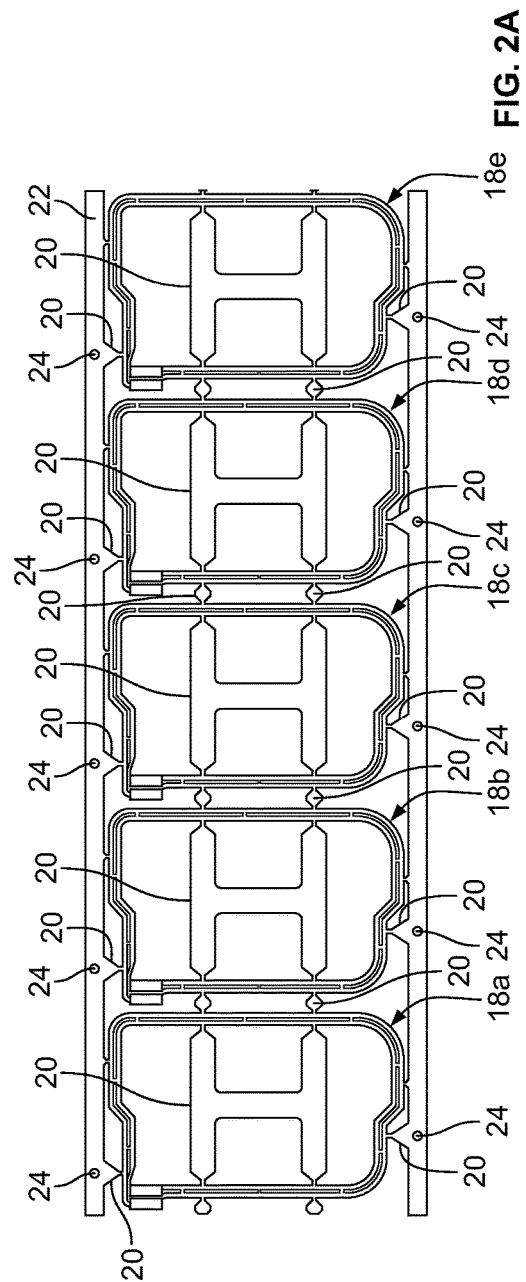
FIG. 2A is a top view showing a near field communication antenna biscuit of the present disclosure after a first stamping.

FIG. 1 is a diagrammatic illustration of a sequential manufacturing line for manufacturing a stamped antenna and provides a general overview of the manufacturing process. It should be understood by one of ordinary skill in the art that this manufacturing process can be employed in the manufacture of any antenna that includes thin traces, e.g., antennas used in radio frequency identification tags, inductive charging circuitry, etc. The antennas are manufactured at a plurality of stations that are arranged sequentially about the manufacturing line 10. A supply reel 12 feeds an antenna material, e.g., a thin sheet of copper such as copper foil, to a first station 14 that includes a first precision high-speed stamping press for performing a first partial stamping of the antenna. FIG. 2A is a top view showing a group of near field communication antennas 16 after a first partial stamping by the first stamping press. After the first stamping, the antennas 18a-e include tie bars 20 and carriers 22 to add stability and support to the partially stamped antennas. After each group of antennas, the copper sheet is cut so that a near field communication antenna biscuit is created having a group of antennas, e.g., five as shown in FIG. 2A. The biscuit 16 includes antennas 18a-e connected with carriers 22 and a series of tie bars 20 that extend between the antennas 18a-3 and within each respective antenna 18a-e. Further, the tie bars 20 within each antenna 18a-e, and between the antennas 18a-e, support the antennas 18a-e and prevent the antennas 18a-e from being misshapen. The biscuit 16 also includes a plurality of pilot holes 24, which will be discussed in greater detail.

Figure 2B:
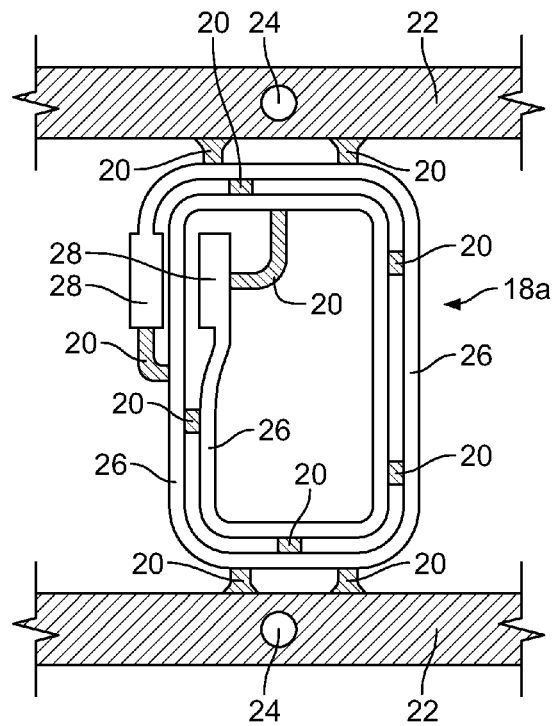
FIG. 2B is a top view showing an example of a single near field communication antenna of the present disclosure stamped for a first time.

FIG. 2B is a top view of an individual antenna 18a from the near field communication antenna biscuit 16 showing the individual antenna 18a in greater detail. As can be seen in FIG. 2B, the antenna 18a includes an intricate shape of thin traces 26 connected to two paddles 28 or contacts. The traces 26 are interconnected by the series of tie bars 20 and connected to the carriers 22. The series of tie bars 20 and carriers 22 provide stabilization, support, and strength for the thin traces 26 of the antenna 18a so that the traces 26 can be further processed without risk of breakage. At a second station 27, the two contacts 28 could be gold plated.

Figure 3A:
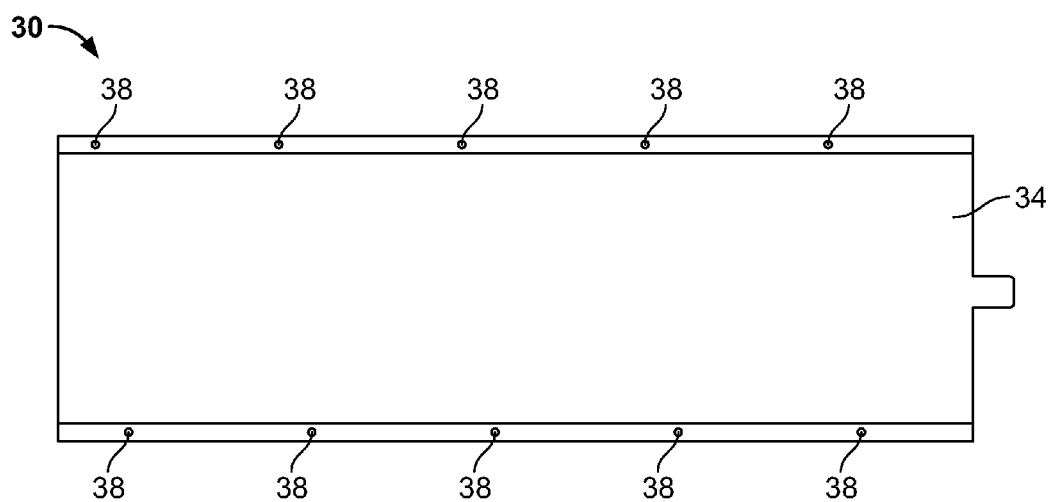
FIG. 3A is a top view of a pressure sensitive adhesive pad of the present disclosure.
Figure 3B:
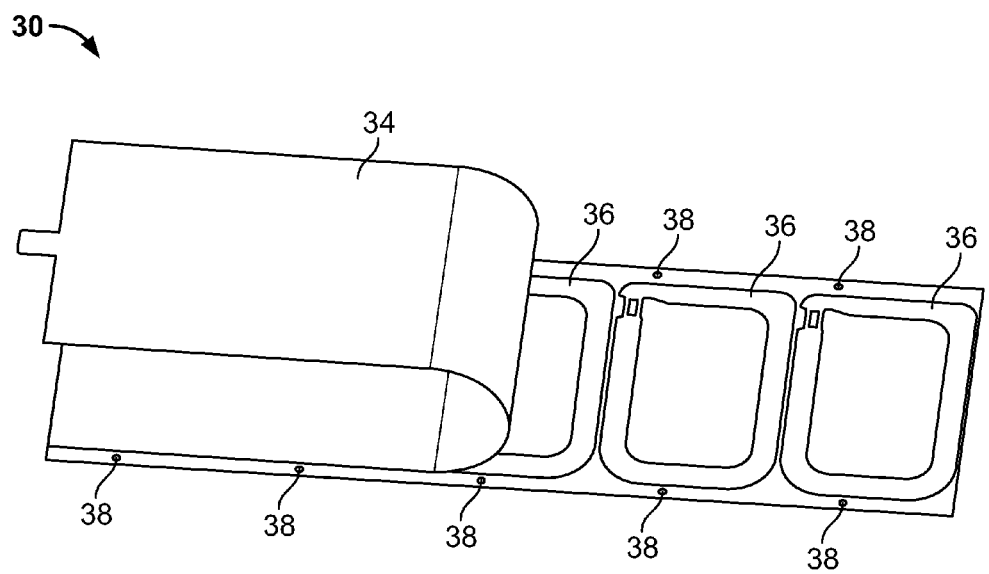
FIG. 3B is a perspective view of the pressure sensitive adhesive pad of FIG. 3A with the release liner partially removed showing the pattern of adhesive.
Figure 3C:
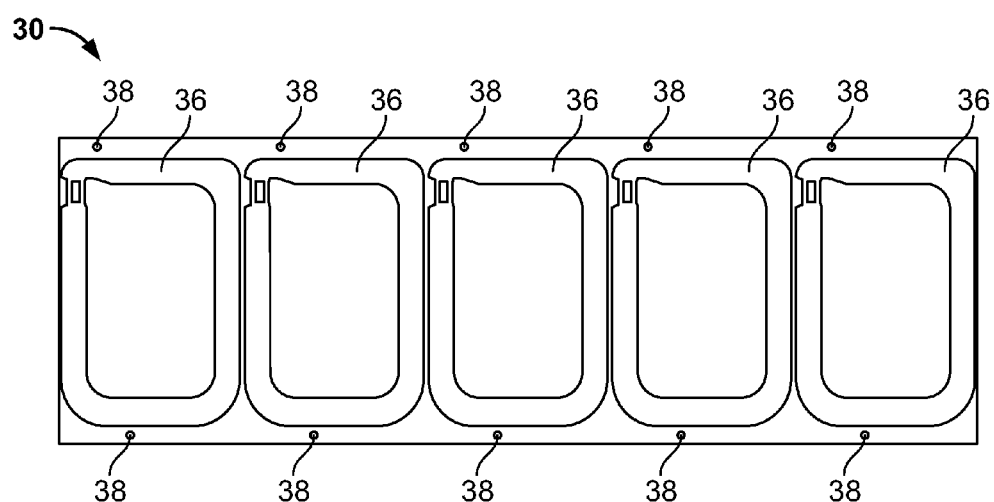
FIG. 3C is a top view of the pressure sensitive adhesive pad of FIG. 3A with the release liner fully removed showing the pattern of adhesive.

At a third station 29, a pressure sensitive adhesive (PSA) pad 30 is placed onto a fixture 32 or jig. FIG. 3A is a top view of a PSA pad 30 including a release liner 34. FIG. 3B is a perspective view of the PSA pad 30 of FIG. 3A with the release liner 34 partially removed. FIG. 3C is a perspective view of the PSA pad 30 with the release liner 34 completely removed. Removal of the release liner 34 exposes a plurality of adhesive areas 36, having the general shape of the antennas. The PSA pad 30 includes a release liner 34, adhesive areas 36, and a plurality of die cut holes 38. The PSA pad 30 of FIGS. 3A-3C includes five adhesive areas 36 to match the five antenna 18a-e. The adhesive areas 36 are located and shaped to match the five antenna 18a-e such that the antenna traces 26 and contacts 28 are bonded with the adhesive areas 36. The plurality of die cut holes 38 could be positioned along the perimeter of the PSA pad 30. The die cut holes 38 match with any fixture pins 42 on the fixture 32 or jig, as well as the pilot holes 24 of the antenna biscuit 16, and facilitate alignment of the PSA pad 30 on the fixture 32, and alignment of the PSA pad 30 with the antenna biscuit 16.

Figure 4:
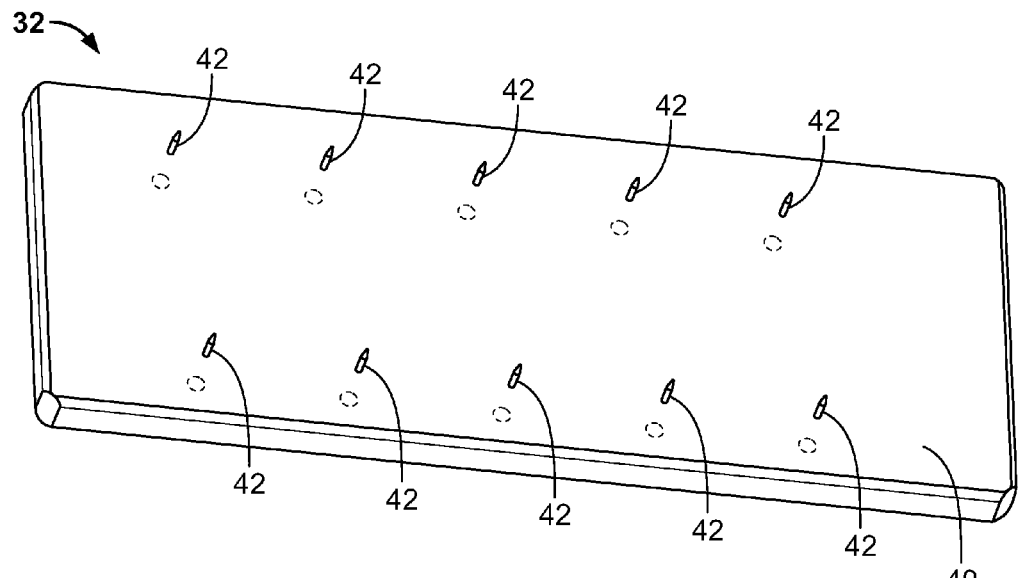
FIG. 4 is a perspective view of a fixture for receiving a pressure sensitive adhesive and first stamped antenna for further processing.

FIG. 4 is a perspective view of a fixture 32 for receiving the PSA pad 30 and the antenna biscuit 16. The fixture 32 includes a body 40 and a plurality of pins 42 for alignment of the PSA pad 30 and the antenna biscuit 16.

Figure 5:
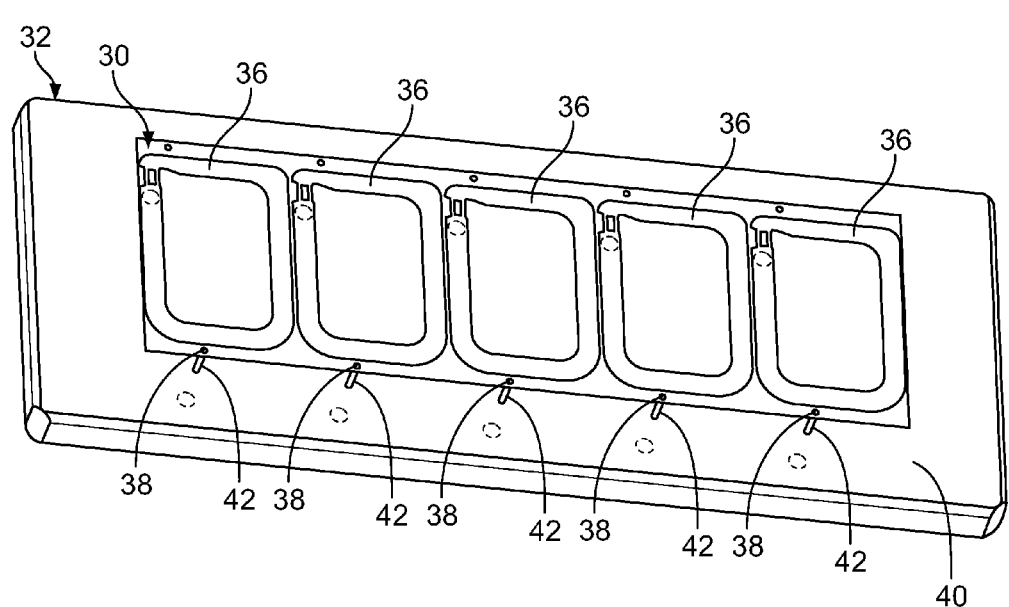
FIG. 5 is a perspective view the pressure sensitive adhesive pad of FIG. 3C on the fixture of FIG. 4.

FIG. 5 is a perspective view of the PSA pad 30 on the fixture 32 of FIG. 4. The PSA pad 30 is placed over the fixture 32 so that the plurality of pins 42 are inserted into the die cut holes 38 of the PSA pad 30. The release liner 34 of the PSA pad 30 is removed prior to placing the PSA pad 30 onto the fixture 32.

Figure 6:
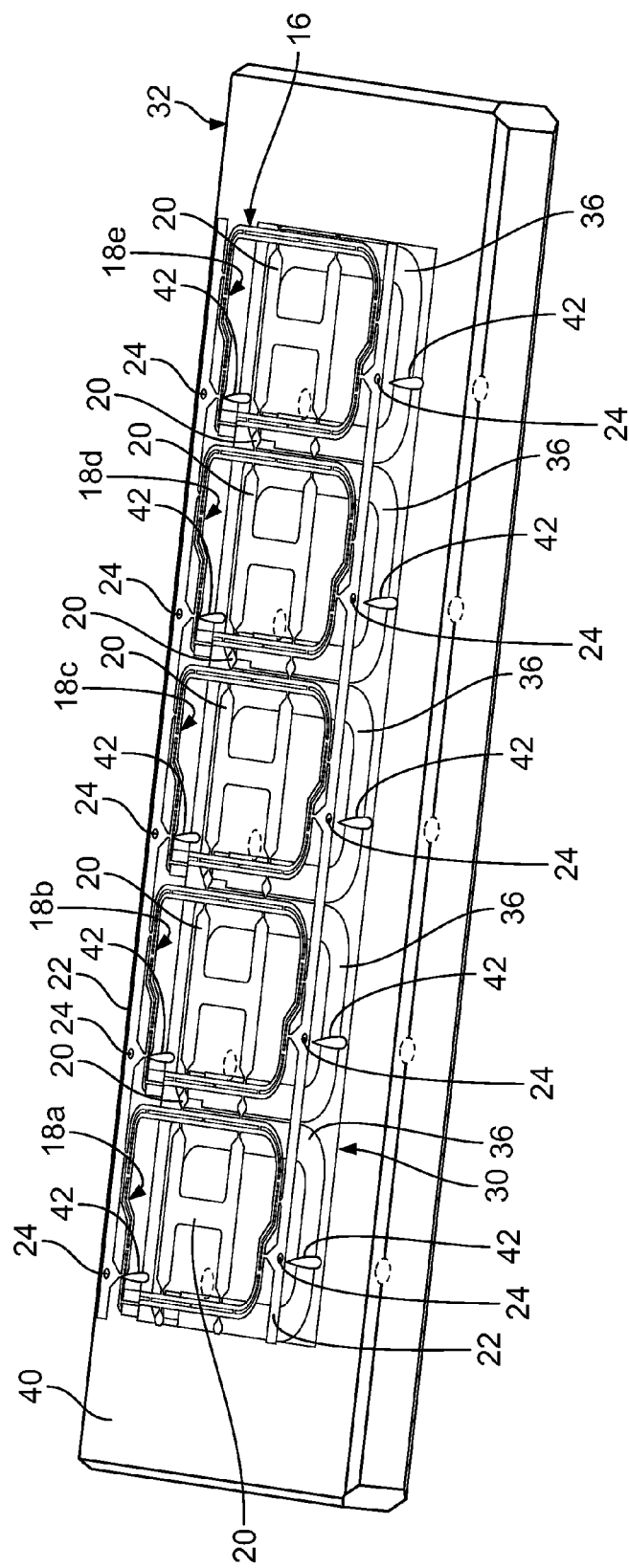
FIG. 6 is a perspective view the near field communication antenna biscuit of FIGS. 2A-2B on the fixture including the pressure sensitive adhesive of FIG. 5.
Figure 7:
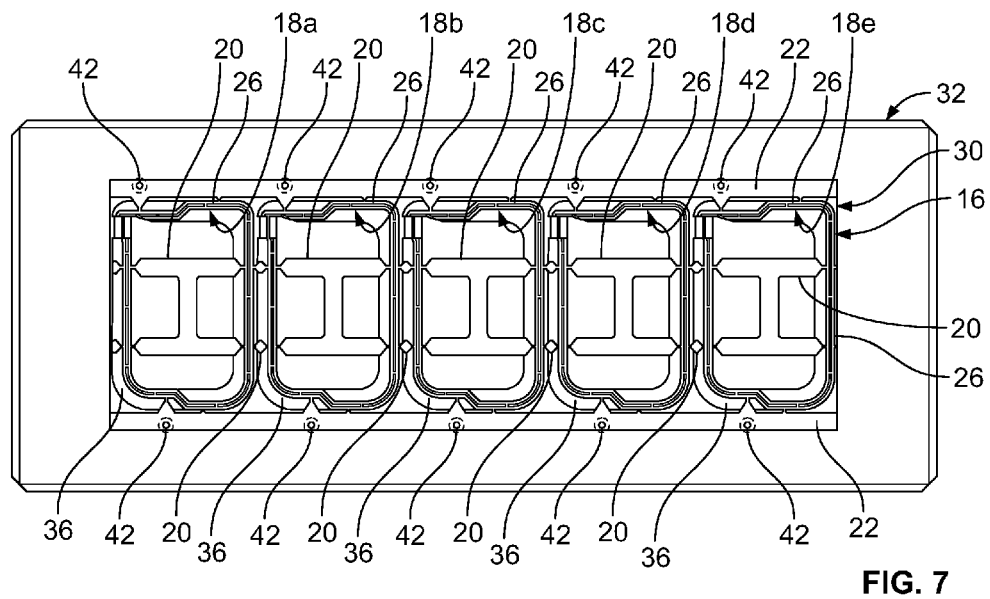
FIG. 7 is a top view the near field communication antenna biscuit of FIGS. 2A-2B and the pressure sensitive adhesive of FIG. 5 on the fixture.
Figure 8:
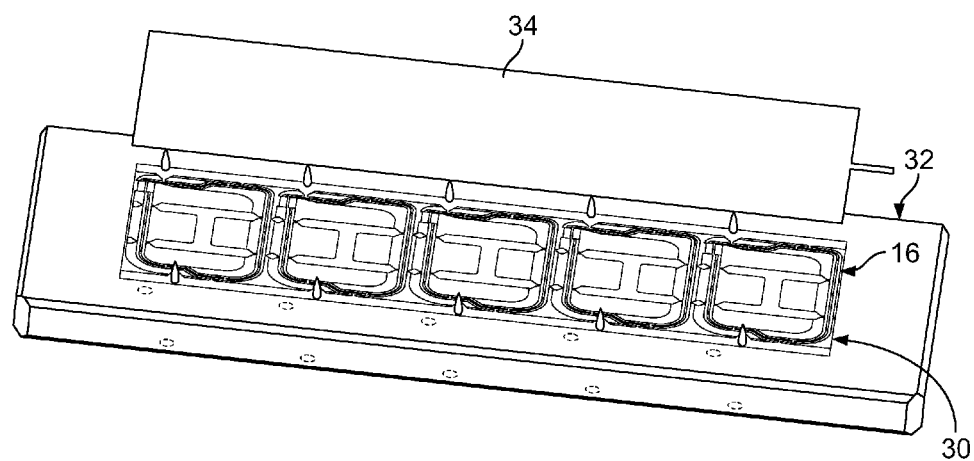
FIG. 8 is a perspective view of the release liner being placed on the near field communication antenna biscuit that has been placed onto the fixture.

The antenna biscuit 16 is then transferred to the third station 29 to be aligned with the PSA pad 30 and the fixture 32. FIG. 6 is a perspective view of the group of antennas 16 of FIG. 1 on the fixture 32 having a PSA pad 30 already placed thereon. The plurality of fixture pins 42 extend through the die cut holes 38 of the PSA pad 30 and facilitate alignment of the PSA pad 30 and the near field communication antenna biscuit 16. The near field communication antenna biscuit 16 is placed onto the fixture 32 so that the fixture pins 42 extend through the pilot holes 24. FIG. 7 is a top view showing the near field communication antenna biscuit 16 and the PSA pad 30 on the fixture 32. As can be seen, the traces 26 of each antenna 18a-e overlap an adhesive portion 36 of the PSA pad 30. The previously removed release liner 34 is then placed on top of the near field communication antenna biscuit 16 as shown in FIG. 8. Placing the release liner 34 over the near field communication antenna biscuit 16 protects the PSA pad 30 during additional stamping processes.

Figure 9:
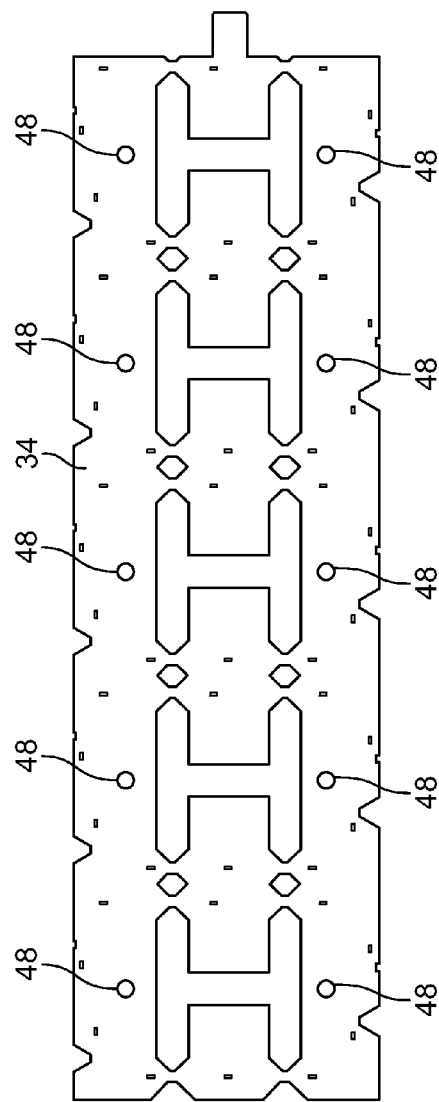
FIG. 9 is a top view of the near field communication antennas and release liner after a second stamping.

The fixture 32, PSA pad 30 and antenna biscuit 16 are transferred to a fourth station 44 for bonding the antenna biscuit 16 with the PSA pad 30. The fourth station 44 includes rollers that provide pressure for activating the PSA 30 and bonding the antenna biscuit 16 with the PSA pad 30. Once bonded, the antenna biscuit 16, now with a PSA layer 30, is advanced to a fifth station 46 that includes a second precision high-speed stamping press for performing a second antenna stamping. The second stamping press performs a second stamping operation on the antenna biscuit 16 wherein the tie bars 20 are stamped and removed from each antenna 18a-e. The second stamping press stamps through the foil that makes up the tie bars 20, the PSA bonded to the tie bars 20, and the release liner 34. The carriers 22 will fall away upon stamping of the tie bars 20 because the carriers 22 are generally outside the adhesive area 36 of the PSA pads 30. As such, the second stamping operation effectively removes each individual antenna 18a-e from the antenna biscuit 16 so that each antenna 18a-e is by itself, but supported by the PSA pad 30. FIG. 9 is a top view of the antenna biscuit 16, PSA pad 30, and release liner 34 after the secondary stamping. The antenna biscuit 16 and PSA pad 30 cannot be seen because they are covered by the release liner 34. As can be seen, the plurality of tie bars 20 and carriers 22 have been stamped out and removed. The second stamping process can also stamp a plurality of guide holes 48 for future ferrite shield application, which will be discussed in greater detail.

Figure 10:
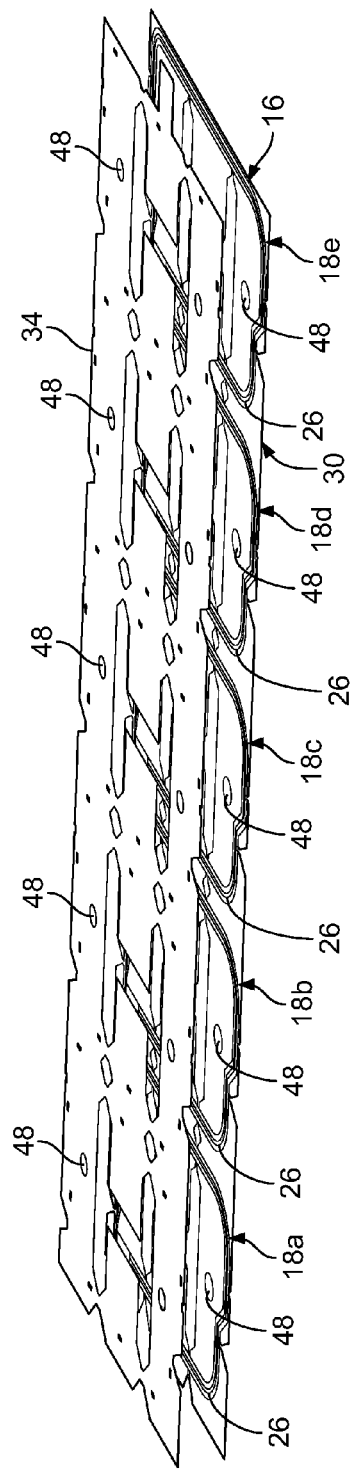
FIG. 10 is a perspective view of the near field communication antennas after a second stamping of FIG. 9 with the release liner detached from the antennas.
Figure 11:
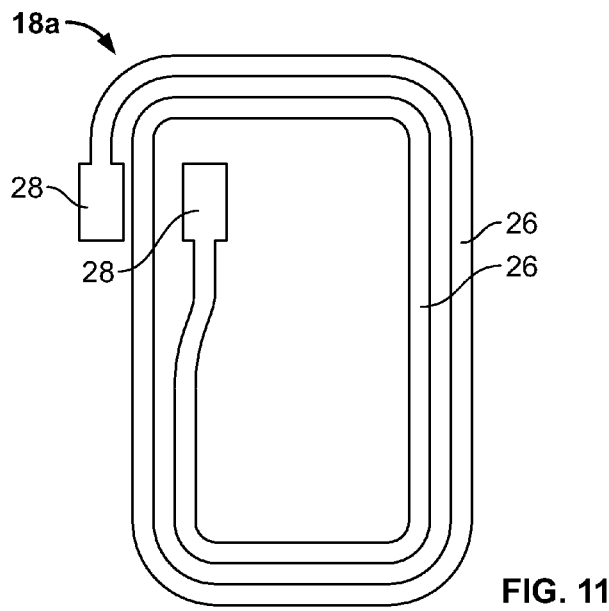
FIG. 11 is a top view of a single near field communication antenna of the present disclosure after a second stamping.

Once the second stamping is complete the release liner 34 can be peeled away, as shown in FIG. 10, which is a perspective view showing the release liner 34 removed from the antenna biscuit 16. When the release liner 34 is removed, five individual and disconnected antennas 18a-e bonded to a single piece PSA pad 30 remain. In one embodiment, the PSA pad 30 may be cut so that each individual antenna 18a-e is separated from one another. FIG. 11 is a top view of an individual antenna 18a after the second stamping and separated from the other individual antennas 18b-e. The completed antenna 18a no longer includes a tie bar 20 connecting the traces 26 or the contacts 28. The completed antennas 18a-e can then be sent to a sixth station 50 where they are packaged for distribution.

Figure 12:
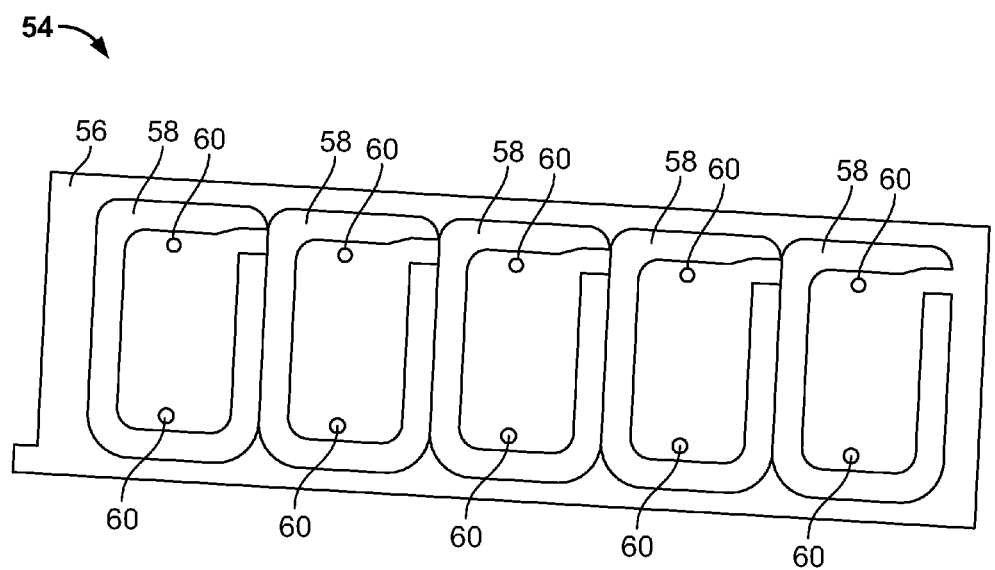
FIG. 12 is a top view of a ferrite shield assembly sheet of the present disclosure.

In an alternative embodiment, the antenna biscuit 16 and PSA pad 30 of FIG. 10, e.g., without the release liner 34, could be sent to an alternative sixth station 52 where instead of being cut into individual antennas, they are instead bonded with a ferrite shield. FIG. 12 is a view of a ferrite shield 54 assembly sheet that may be used. The ferrite shield assembly sheet 54 includes a liner 56, a series of ferrite shields 58, and a plurality of pilot holes 60. The ferrite shield assembly sheet 54 is generally sized, dimensioned, and arranged so that each individual ferrite shield 58 generally overlaps a respective antenna 18a-e of the antenna biscuit 16.

Figure 13:
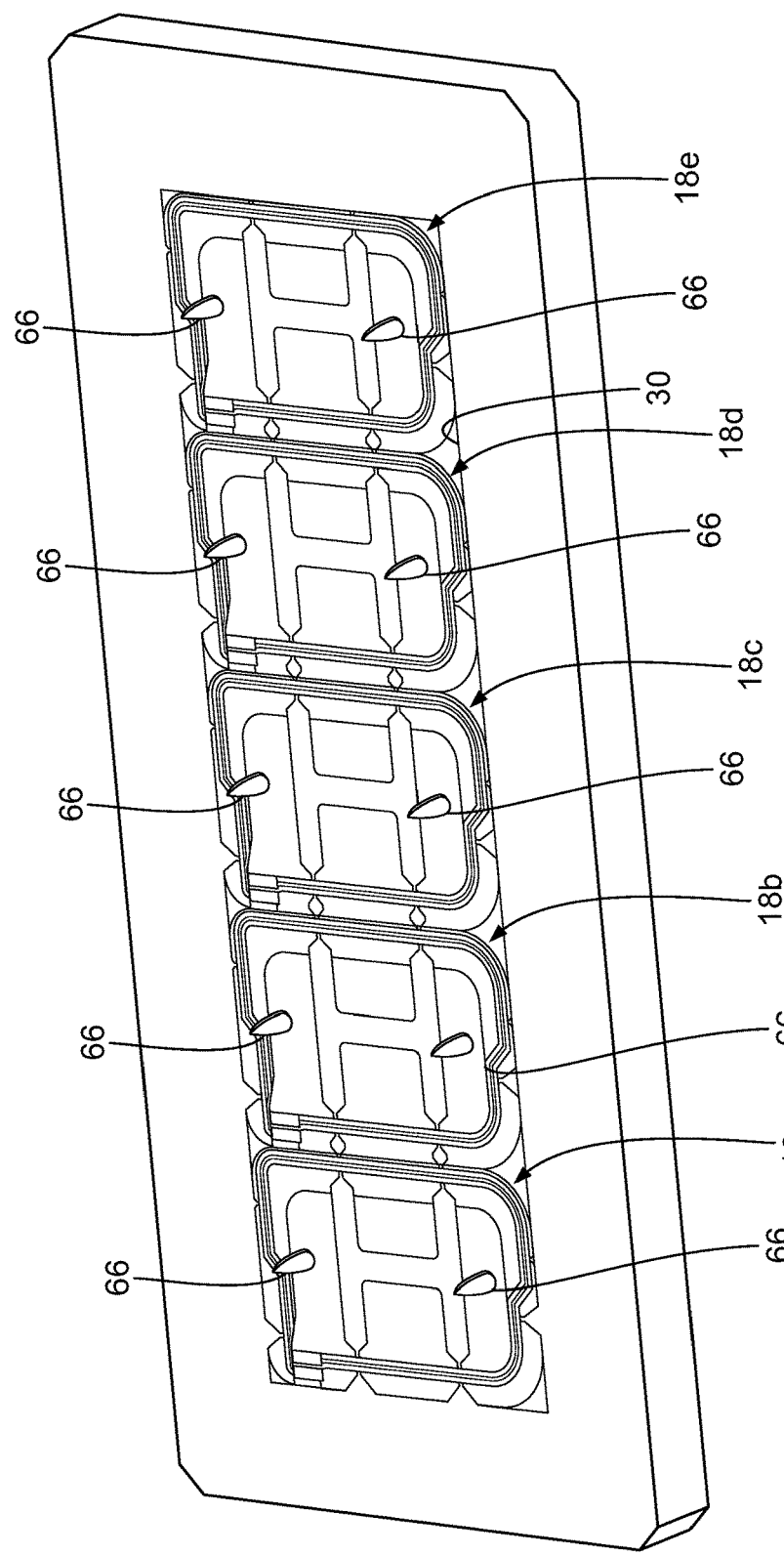
FIG. 13 is a perspective view of a near field communication antenna biscuit on a fixture prior to application of a ferrite layer.
Figure 14:
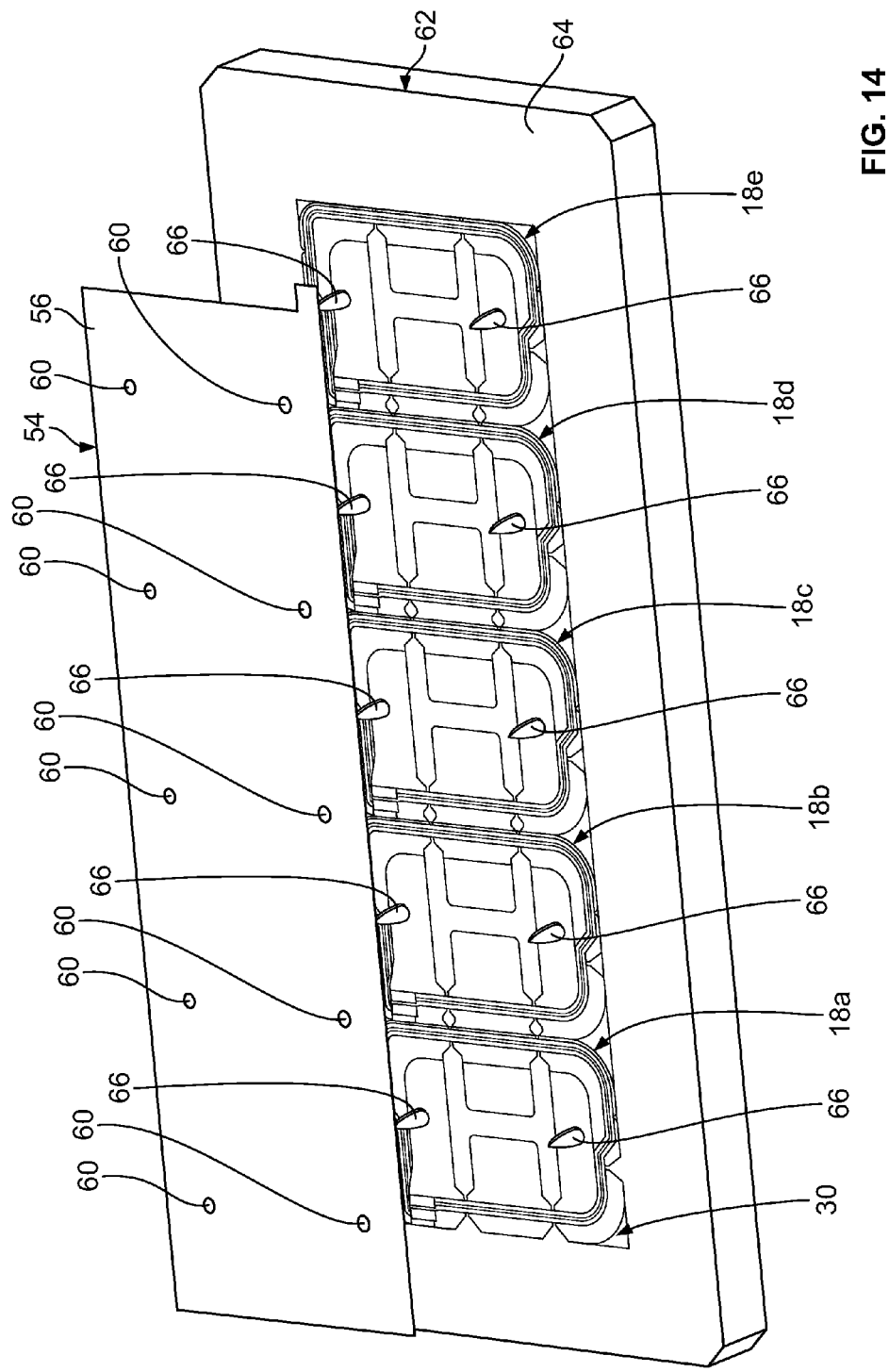
FIG. 14 is a perspective view of the near field communication antenna biscuit of FIG. 13 with the ferrite shield assembly sheet of FIG. 12 being placed thereon.
Figure 15:
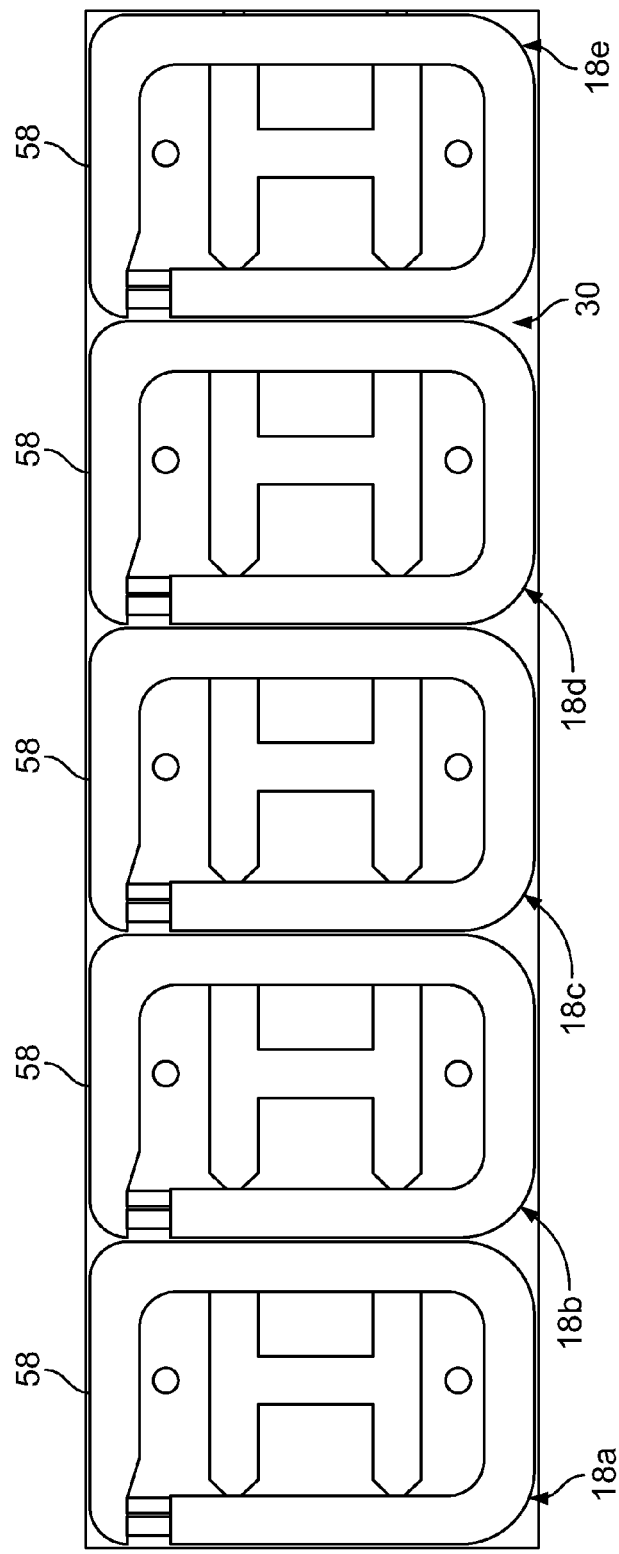
FIG. 15 is a top view of the near field communication antenna biscuit with a ferrite layer applied.
Figure 16:
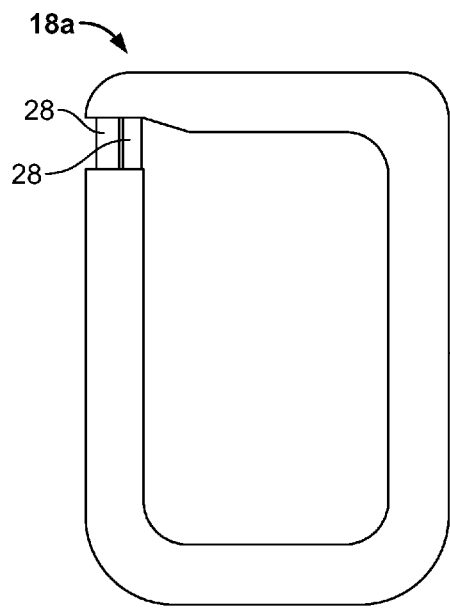
FIG. 16 is a top view of an individual near field communication antennas with a ferrite layer applied.
Figure 17:
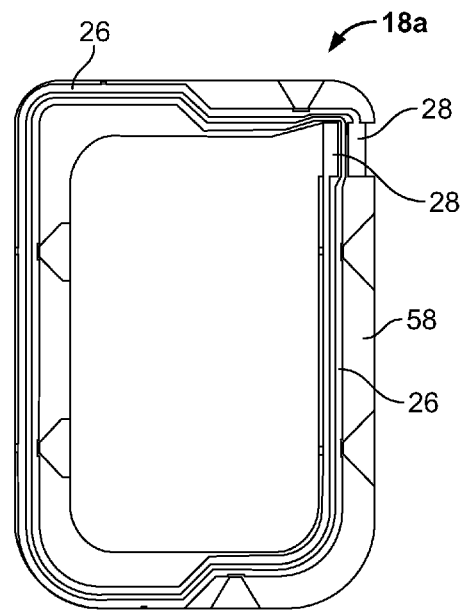
FIG. 17 is a bottom view of an individual near field communication antennas with a ferrite layer applied.

FIG. 13 is a perspective view of the antennas 18a-e and PSA pad 30 sub-assembly placed on a fixture, with the antennas 18a-e facing upward and the PSA pad 30 abutting the fixture 62. The fixture 62 includes a body 64 and a plurality of guide pins 66 that are aligned with and inserted into the guide holes 48 the PSA pad 30. As shown in the perspective view of FIG. 14, the ferrite shield assembly sheet 54 of FIG. 12 is placed on to the fixture 62 such that the guide pins 66 of the fixture 62 are aligned with and inserted into the pilot holes 60 of the ferrite shield assembly sheet 54. The ferrite shield assembly sheet 54 is oriented such that the series of ferrite shields 58 are facing the copper antennas 18a-e. When the ferrite shield assembly sheet 54 is placed on the fixture 62, the ferrite shields 58 overlap the antennas 18a-e, such that there is one ferrite shield 58 for each individual antenna 18a-e. The ferrite shields 58 are then bonded to the respective antenna 18a-e by means that are known in the art, for example, a vacuum adhesive. Once bonded, the ferrite shield liner 56 can be removed, leaving a series of five individual antenna 18a-e each having a ferrite shield 58 bonded thereto, as shown in FIG. 15. The antennas 18a-e, held together as a group by the PSA pad 30, can be cut into individual antenna 18a-e and the PSA pad 30 can be removed. FIGS. 16-17 show an antenna 18a having a ferrite shield 58.

Figure 18:
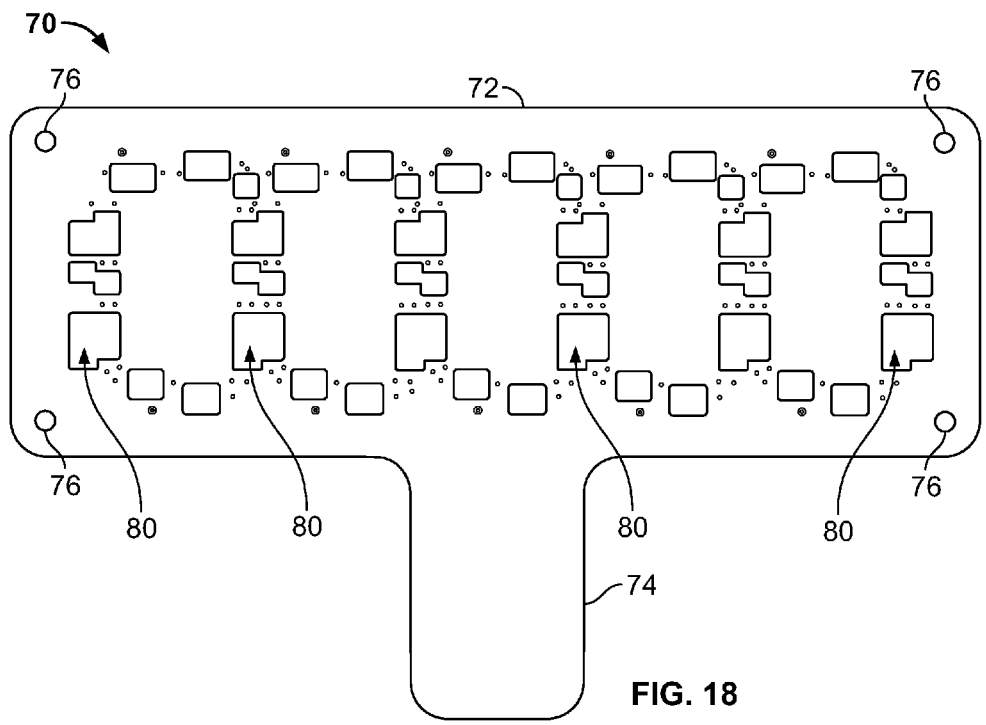
FIG. 18 is a top view of a pallet that can be used for manufacturing a stamped antenna.
Figure 19:
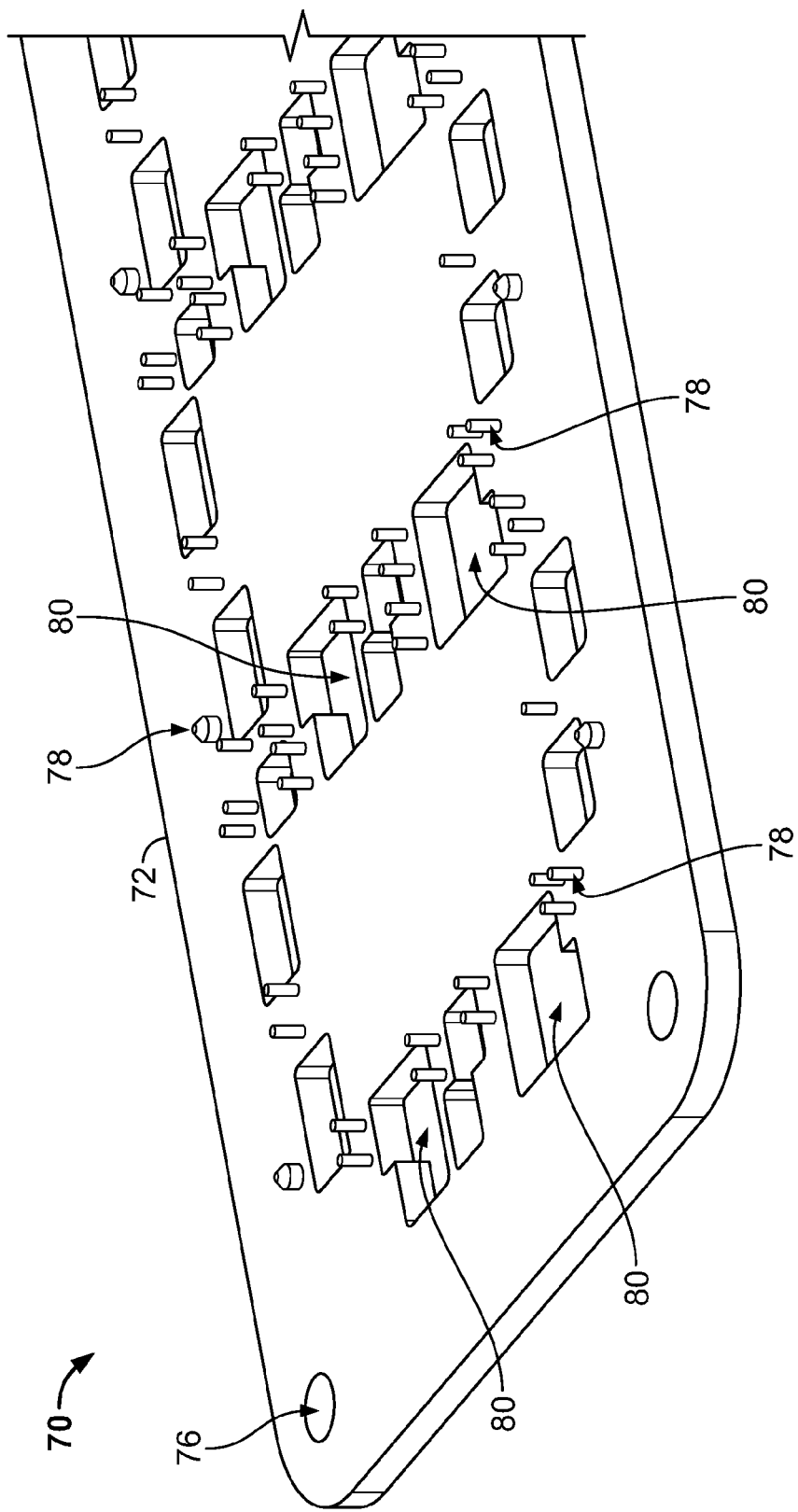
FIG. 19 is a perspective view of the pallet of FIG. 18.
Figure 20:
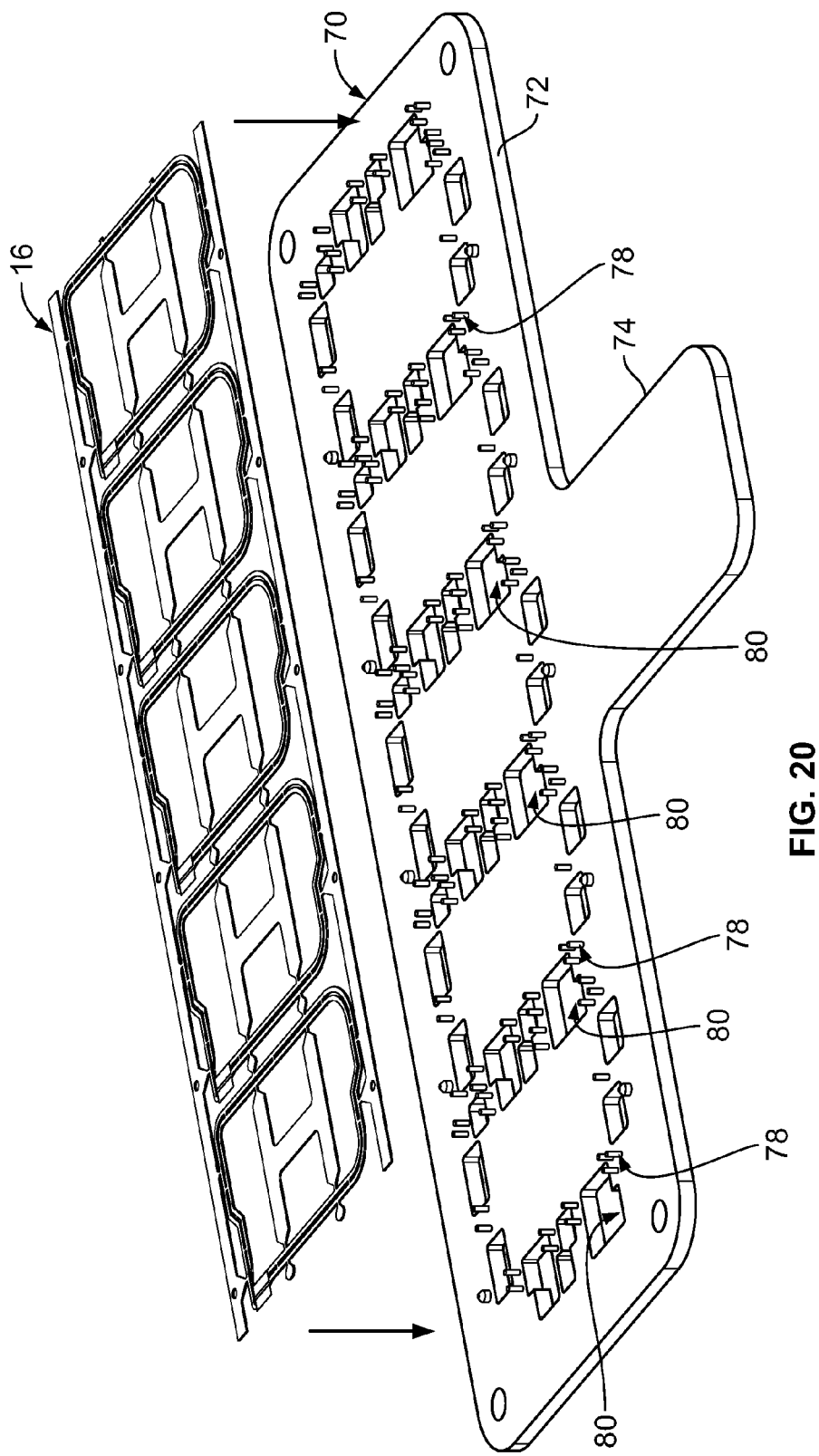
FIG. 20 is a perspective view of the near field communication antenna biscuit of FIG. 2 being placed onto the pallet of FIG. 18.

FIGS. 18-20 show an alternative embodiment in which a pallet 70 is used in place of the fixture 32. The pallet 70 includes a body 72, a handle 74 extending from the body 72, a plurality of pilot holes 76, a plurality of guide pins 78, and a plurality of removed sections 80. The plurality of pilot holes 76 are positioned to match guide pins of a stamping machine so that the pallet 70 is properly aligned when engaged with the machine. The plurality of guide pins 78 facilitate positioning a PSA pad 30, antenna biscuit 16, and ferrite shield assembly sheet 54 during manufacturing. The guide pins 78 ensure that the PSA pad 30 and antenna biscuit 16 are located such that the tie bars 20, carriers 22, and portions that need to be cut by pressing are positioned over the removed sections 80. The removed sections 80 allow a die to be pressed through the PSA pad 30 and the antenna biscuit 16, thus facilitating removal of the tie bars 20 and carriers 22.

Figure 21:
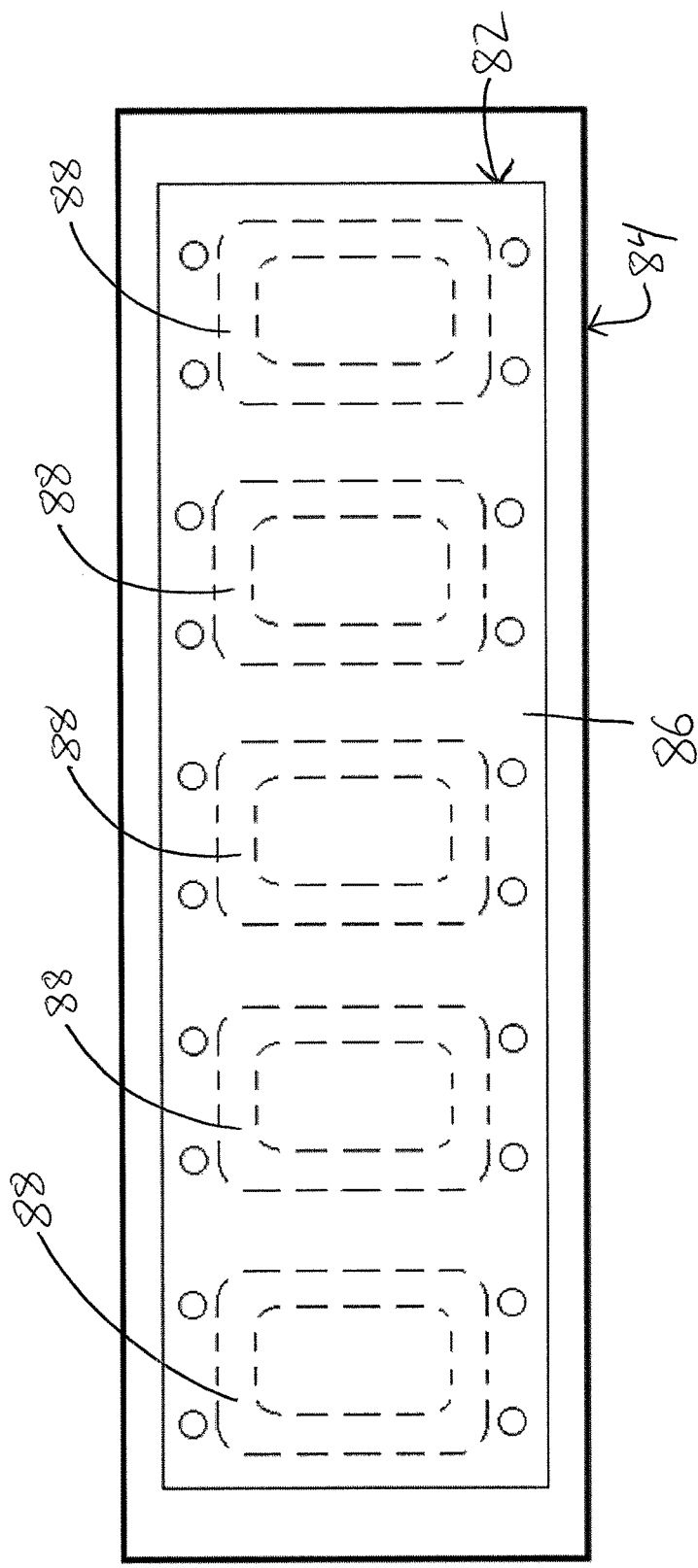
FIG. 21 is a top view of a ferrite shield assembly sheet placed on a first fixture or pallet.

FIGS. 21-25 shown another method for applying a ferrite shield layer. FIG. 21 is a top view of a ferrite shield assembly sheet 82 placed on a first fixture or pallet 84. The ferrite shield assembly 82 includes a liner 86 and a plurality of ferrite shields 88. The ferrite shield assembly 82 is placed on the first fixture 84 such that the ferrite shields 88 are face down on the first fixture 84, e.g., adjacent the first fixture 84, and the liner 86 is face up. The first fixture 84 can include a vacuum or magnets that hold the ferrite shields 88 in place. Accordingly, the liner 86 can be removed from the ferrite shields 88, and the ferrite shields 88 will be retained in place by the fixture 84.

Figure 22A:
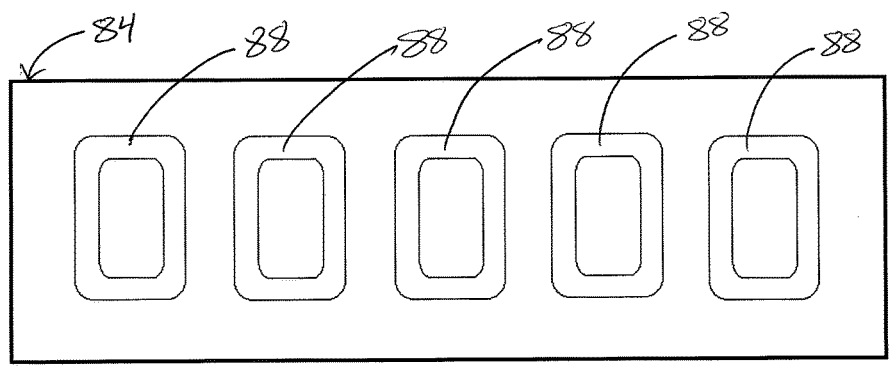
FIG. 22A is a top view of the ferrite shields on the first fixture.
Figure 22B:
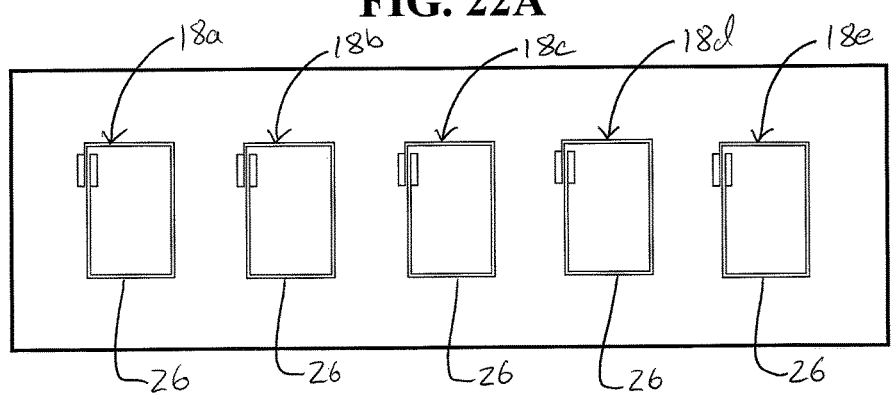
FIG. 22B is a top view of the plurality of antennas on a second fixture or pallet.
Figure 22C:
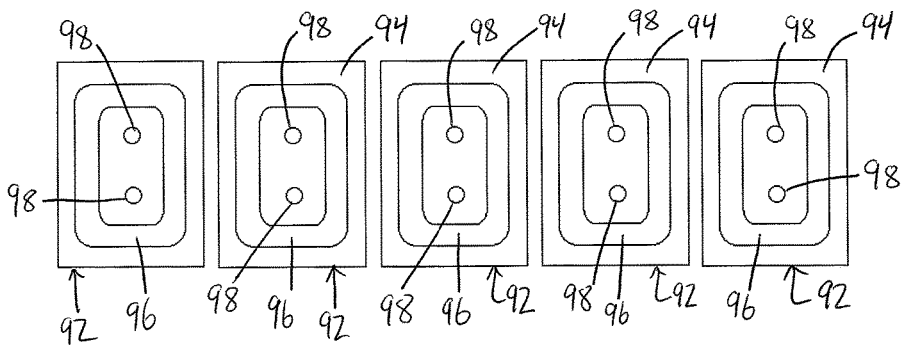
FIG. 22C is a top view of a plurality of adhesive cards.

FIG. 22A is a top view of the ferrite shields 88 on the first fixture 84. FIG. 22B is a top view of the plurality of antennas 18a-e on a second fixture or pallet 90. FIG. 22C is a top view of a plurality of adhesive cards 92. Each of the plurality of adhesive cards 92 includes a bottom release liner (not shown), a top liner 94, an adhesive area 96, an two alignment holes 98. The bottom release liner is a continuous liner that spans one or more of the adhesive cards such as the five adhesive cards 92 shown, and is removed during assembly to expose the adhesive areas 96. The top liner 94 is cut into a square/rectangle that extends beyond the edges of the adhesive area 96. The two alignment holes 98 facilitate alignment of the adhesive cards 92 with a pick-up pad.

Figure 23:
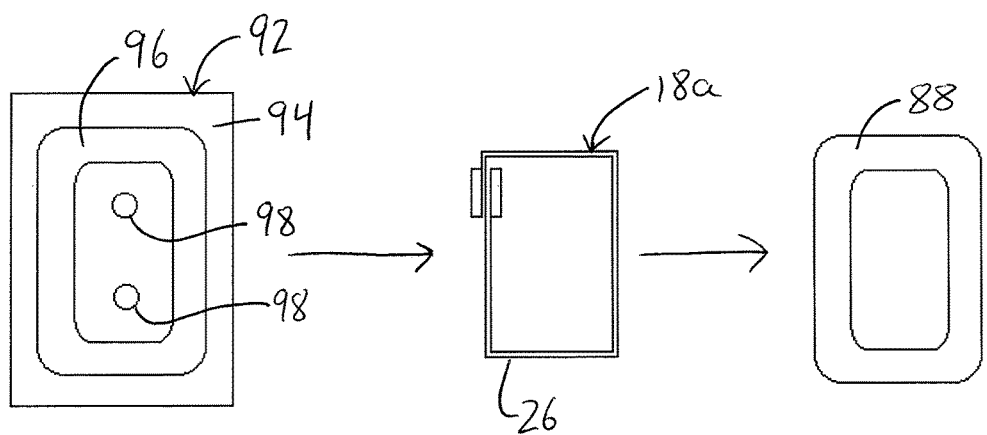
FIG. 23 is a top view of an adhesive card, an antenna, and a ferrite shield, showing the order that they are applied.
Figure 24:
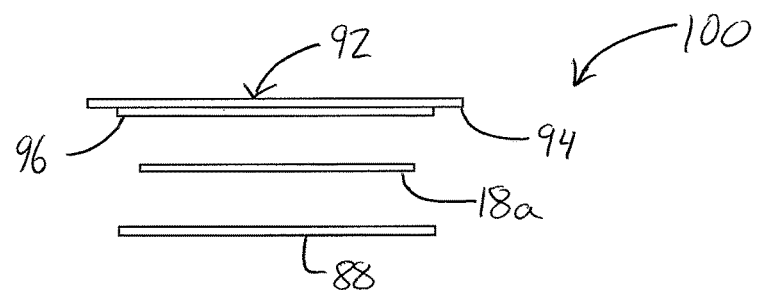
FIG. 24 is an exploded view of a completed antenna including a ferrite shield.

FIG. 23 is a top view of an adhesive card 92, an antenna 18a, and a ferrite shield 88, showing the order that they are assembled. As shown in FIG. 23, the adhesive card 92 is first applied to the antenna 18a, and then the ferrite shield 88 is applied over the antenna 18a and onto the adhesive card 92. This application process is discussed in greater detail in connection with FIG. 25. FIG. 24 is an exploded side view of a completed antenna 100 including a ferrite shield 88. The completed antenna 100 includes a plurality of layers that include, from top to bottom, the top liner 94, the adhesive area 96, the antenna 18a, and the ferrite shield 88.

Figure 25:
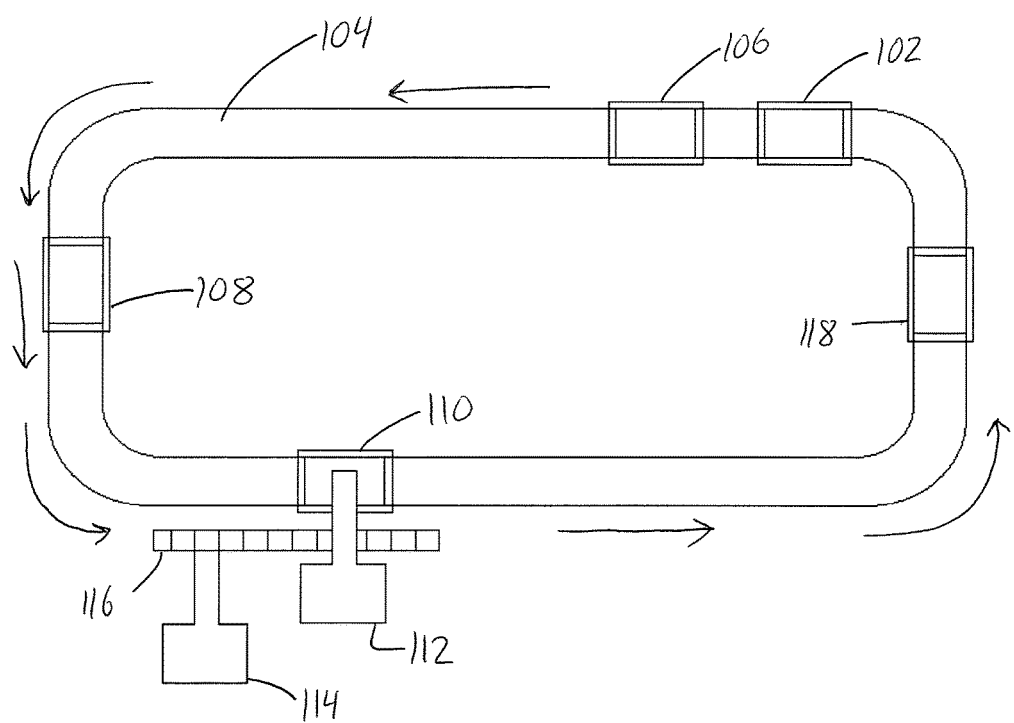
FIG. 25 is a plan view of a sample manufacturing process for applying the ferrite shields.

FIG. 25 is a plan view of a sample manufacturing process for applying the ferrite shield 88. Once the PSA 30 is bonded with an the antenna biscuit at the fourth station 44 of FIG. 1, the antenna biscuit with PSA layer 30 can be transferred to a loading station 102, where it is loaded onto a conveyor belt or track 104. The antenna biscuit is transferred to a second or complete stamping station 106 where the tie-bars are removed and the antennas are singulated by a second stamping process, which is in accordance with the fifth station 46 of FIG. 1, described above. The individual antennas are delivered by the conveyor 104 to a pallet loading station 108 where the antennas are placed on a pallet or plate. The pallet could be configured like the pallet 70 shown in FIGS. 18-20. The pallet can hold any number of antennas, such as five antennas, for example. The pallet with antennas is then conveyed to an assembly station 110.

The assembly station 110 could include a robotic device 112, which could have 3-axis movement, an adhesive applicator 114, and a robotic cylinder 116. The assembly station 110 receives the antennas and attaches the ferrite shields 88. In preparation for applying the ferrite shields 88 to the antennas, the adhesive applicator 114 removes the bottom liner of the adhesive cards 92, rolls the removed bottom liner onto a scrap roller, and places each adhesive card 92 into a tray of the robotic cylinder 116. The robotic cylinder 116 transfers the adhesive cards 92 to the robotic device 112. The robot device 112 could be a robotic pick-up pad that could be a vacuum pad attached to the end of an arm of the robotic device 112 to pick up the adhesive cards 92. The robotic device 112 includes pilot pins that engage the alignment holes 98 of the adhesive cards 92 and locate/align the adhesive cards 92. Once the adhesive cards 92 are ready for transferring, the robotic device 112 moves the adhesive cards 92 into alignment over the antennas, which are transferred by the pallet 70. The robot 112 then stamps the adhesive cards 92 onto the antennas, such that the adhesive areas 96 engage the antennas, and picks the antennas up. Next, the robotic device 112 moves the adhesive card 92 and antenna sub-assembly over the first fixture 84 containing the ferrite shields 88, and stamps down on the ferrite shields 88 to bond the ferrite shields 88 to the antennas and the adhesive cards 92. The antennas, including adhesive cards 92 and ferrite shields 88, are then transferred along the conveyor belt to a pick-and-pack station 118 where the antennas are removed from the conveyor 104, scrap is removed, and the antennas are packaged.

Having thus described the invention in detail, it is to be understood that the foregoing description is not intended to limit the spirit or scope thereof. What is desired to be protected is set forth in the following claims.

What is claimed is:

1. A method of manufacturing an antenna, comprising:
   providing a sheet of metallic material;
   performing a first stamping of the sheet of metallic material to form at least one antenna, the at least one antenna including traces, contacts, a carrier connected to the traces, and at least one tie-bar connected between the traces;
   providing a pad with at least one pressure sensitive adhesive area, the at least one pressure sensitive adhesive area provided on the pad in substantially the same shape as the traces of the at least one antenna;
   aligning the at least one pressure sensitive adhesive area with the traces of the at least one antenna after the at least one antenna has been stamped for a first time;
   bonding the at least one pressure sensitive adhesive area to the traces of the at least one antenna after the at least one antenna has been stamped for a first time and the at least one pressure sensitive adhesive area has been aligned with the traces of the at least one antenna; and
   performing a second stamping of the at least one antenna and the at least one pressure sensitive adhesive area to remove the at least one carrier and the at least one tie-bar connected to the traces.

2. The method of manufacturing an antenna of claim 1, wherein the first stamping forms more than one antenna as a group connected by at least one tie-bar or the carrier.

3. The method of manufacturing an antenna of claim 2, wherein the pad includes more than one pressure sensitive adhesive area.

4. The method of manufacturing an antenna of claim 3, wherein the more than one antenna are separated from one another after the second stamping.

5. The method of manufacturing an antenna of claim 1, wherein the carrier includes at least one pilot hole and the pad includes at least one die cut hole.

6. The method of manufacturing an antenna of claim 5, further comprising:
   placing the antenna stamped for a first time on a fixture having at least one fixture pin, the fixture pin being inserted through the at least one pilot hole;
   placing the pad on the fixture, the fixture pin being inserted through the at least one die cut hole;
   wherein the fixture pin aligns the first stamped antenna and the pad such that the at least one pressure sensitive adhesive area of the pad is positioned on the traces of the antenna.

7. The method of manufacturing an antenna of claim 6, wherein the fixture is a pallet.

8. The method of manufacturing an antenna of claim 1, wherein the sheet of metallic material is copper.

9. The method of manufacturing an antenna of claim 1, further comprising:
   bonding a ferrite shield to the at least one antenna stamped for a second time.

10. The method of manufacturing an antenna of claim 9, wherein the carrier includes a pilot hole, the pad includes a first and a second die cut hole, and the ferrite shield includes a pilot hole.

* * * * *